(12) United States Patent
Casalini et al.

(10) Patent No.: US 8,535,585 B2
(45) Date of Patent: Sep. 17, 2013

(54) PROCESS FOR THE PREPARATION OF GRANULES BASED ON EXPANDABLE THERMOPLASTIC POLYMERS AND RELATIVE PRODUCT

(75) Inventors: Alessandro Casalini, Mantova (IT); Riccardo Felisari, S. Giorgio di Mantova (IT)

(73) Assignee: Versalis S.p.A. (IT)

( * ) Notice: Subject to any disclaimer, the term of this patent is extended or adjusted under 35 U.S.C. 154(b) by 512 days.

(21) Appl. No.: 12/598,948

(22) PCT Filed: May 15, 2008

(86) PCT No.: PCT/EP2008/003914
§ 371 (c)(1),
(2), (4) Date: Nov. 5, 2009

(87) PCT Pub. No.: WO2008/141766
PCT Pub. Date: Nov. 27, 2008

(65) Prior Publication Data
US 2010/0130627 A1    May 27, 2010

(30) Foreign Application Priority Data

May 18, 2007 (IT) .............................. MI2007A1005

(51) Int. Cl.
*B29B 9/06* (2006.01)
(52) U.S. Cl.
USPC ....................................................... 264/142
(58) Field of Classification Search
USPC ....................................................... 264/142
See application file for complete search history.

(56) References Cited

U.S. PATENT DOCUMENTS

| | | | |
|---|---|---|---|
| 2,673,194 | A | 3/1954 | Grim |
| 3,372,215 | A | 3/1968 | Muirhead et al. |
| 4,360,611 | A | 11/1982 | Wakimoto et al. |
| 4,500,692 | A | 2/1985 | Wright |
| 5,108,673 | A | 4/1992 | Wegmann |
| 5,573,790 | A | 11/1996 | Wehtje et al. |
| 6,130,265 | A | 10/2000 | Glueck et al. |
| 6,340,713 | B1 | 1/2002 | Glück |
| 6,414,041 | B1 | 7/2002 | Glück |
| 6,465,533 | B1 | 10/2002 | Eberstaller et al. |
| 6,521,672 | B1 | 2/2003 | Glück et al. |
| 2005/0123638 | A1 | 6/2005 | Casalini |
| 2005/0140039 | A1 | 6/2005 | Casalini |
| 2005/0156344 | A1 | 7/2005 | Dietzen et al. |
| 2006/0068052 | A1 | 3/2006 | Remili et al. |
| 2006/0167123 | A1 | 7/2006 | Dietzen et al. |

(Continued)

FOREIGN PATENT DOCUMENTS

| | | |
|---|---|---|
| CA | 2 142 944 C | 8/1995 |
| DE | 24 55 757 A1 | 6/1976 |

(Continued)

*Primary Examiner* — Larry Thrower
(74) *Attorney, Agent, or Firm* — DLA Piper LLP (US)

(57) ABSTRACT

A process for the continuous production of granules based on thermoplastic polymers includes at least one expandable agent and, optionally, other polymers or additives, among which inorganic pigments insoluble in the polymeric matrix, wherein a first main stream is prepared, in the molten state, and a second stream in the molten state, which englobes the additives and which is added to the first stream. The mixture is extruded through a die which is cooled by means of water jets from nozzles positioned behind the cutting blades.

17 Claims, 4 Drawing Sheets

(56) References Cited

U.S. PATENT DOCUMENTS

| | | |
|---|---|---|
| 2006/0189703 A1 | 8/2006 | Noordegraaf |
| 2006/0211780 A1 | 9/2006 | Passaplan et al. |
| 2006/0273482 A1 | 12/2006 | Kobayashi et al. |
| 2007/0112082 A1 | 5/2007 | Hahn et al. |
| 2007/0238794 A1 * | 10/2007 | Hahn et al. .................. 521/80 |
| 2008/0203597 A1 | 8/2008 | Rogov et al. |

FOREIGN PATENT DOCUMENTS

| | | |
|---|---|---|
| DE | 10 2004 034514 A1 | 2/2006 |
| EP | 0 126 459 A2 | 11/1984 |
| EP | 0 668 139 A1 | 8/1995 |
| EP | 1 666 222 A1 | 6/2006 |
| EP | 1 693 413 A1 | 8/2006 |
| EP | 1 702 738 A2 | 9/2006 |
| GB | 1062307 A | 3/1967 |
| JP | 01-110911 | 4/1989 |
| JP | 06-032932 | 2/1994 |
| JP | 06-210628 | 8/1994 |
| JP | 2003-147625 | 5/2003 |
| WO | 98/51734 A1 | 11/1998 |
| WO | 98/51735 A1 | 11/1998 |
| WO | 00/29471 A1 | 5/2000 |
| WO | 00/43442 A1 | 7/2000 |
| WO | 01/03907 | 1/2001 |
| WO | 2005/021648 | 3/2005 |
| WO | WO 2006/007996 * | 1/2006 |
| WO | 2006/088392 A1 | 8/2006 |
| WO | 2007/107584 | 9/2007 |

* cited by examiner

PROCESS FOR THE PREPARATION OF GRANULES BASED ON EXPANDABLE THERMOPLASTIC POLYMERS AND RELATIVE PRODUCT

RELATED APPLICATIONS

This is a §371 of International Application No. PCT/EP2008/003914, with an international filing date of May 15, 2008 (WO 2008/141766 A1, published Nov. 27, 2008), which is based on Italian Patent Application No. MI2007A001005, filed May 18, 2007, the subject matter of which is incorporated by reference.

TECHNICAL FIELD

This disclosure relates to a process for the continuous production of expandable granules based on thermoplastic polymers and the related product.

BACKGROUND

Thermoplastic polymers, for example, vinyl aromatic polymers such as polystyrene, can be made expandable by means incorporating an expandable agent in the polymeric matrix. Typical expanding agents for vinyl aromatic polymers include at least one liquid hydrocarbon containing from 3 to 7 carbon atoms, a halogenated hydrocarbon, carbon dioxide or water. The quantity of expanding agent ranges from 2 to 15% by weight.

Expandable polymers are produced, in general, as beads or granules which, under the action of heat, supplied, for example, by steam, are first expanded until a desired density is reached and, after a certain aging period, are sintered in closed molds to produce blocks or the desired final products.

Expandable beads can be obtained by means of a batch polymerization process in suspension. This process, which is well-known as described in U.S. Pat. No. 2,673,194 and U.S. Pat. No. 4,500,692, which comprise the following steps:
dispersing the liquid vinyl aromatic monomer in an aqueous medium using suspension agents;
adding polymerization catalysts and polymerizing the vinyl aromatic monomer in a stirred, heated reactor;
adding the expansion agent at a certain degree of conversion of the monomer;
completing the polymerization;
discharging, washing, drying and sieving the resulting beads. The diameter of the beads generally ranges from 0.1 to 3 mm.

That suspension process allows a good quality product to be obtained but has various drawbacks, such as:
a very wide distribution of the bead diameter, followed by the necessity of separating the different fractions by screening and discarding the tails;
significant limits in the production of special products, such as colored beads and/or beads which contain heterogeneous fillers or additives, for example nucleating agents and/or flame-retardant agents, as it is difficult to incorporate them into the beads or they can inhibit the polymerization. See, for example, U.S. Pat. No. 4,360,611, or WO 98/51734 and WO 00/29471;
further limits for the use of expanding agents, which must be dispersible and/or soluble in the polymeric matrix or in the use of monomers, which must be capable of polymerizing in aqueous solution;
difficulty in reducing the residual monomer, for example styrene, in the polymer, below 1,000 ppm, and in reducing the total internal water content;
environmental problems due to the considerable water consumption which cannot be simply discharged into the sewers, unless subjected to purification treatment, and to the impossibility of recycling the expanded polymer after use.

These and other drawbacks can be overcome by means of a mass-continuous process in which a polymeric composition in the molten phase is mixed with solid additives and expanding agents. These processes are described, for example, in GB-A-1,062,307 and EP-A-668,139. A process is described in these patents for the production of granules of expandable polystyrene (EPS) according to which the molten polymer and the expanding agent are mixed by means of static mixing elements. After cooling, the mix is granulated through a die.

The product thus obtained generally has the drawback of having a cell structure, after expansion, wherein the cells are irregular and normally too large. The number of cells and the structure of the foam obtained during the expansion play a very important role in obtaining ideal thermal insulation properties and a good surface on the foams. For this reason, the use of nucleating agents is often necessary. EP-A-126,459 describes a process for overcoming these problems by means of a thermal treatment of granules carried out under pressure and at a temperature higher than the glass transition temperature of the expandable polymer.

Furthermore, the expandable resin which leaves the die is difficult to cut due to its natural tendency to expand. In US 2006/167123 a process is described which exploits this characteristic to obtain low density expanded granules by means of the direct cutting of the expandable molten polymer exiting the die.

In other processes, described for example in U.S. Pat. No. 5,108,673 and U.S. Pat. No. 5,573,790, the expandable polymer is extruded into continuous filaments, immediately cooled with cold water at the outlet of the die and granulated in a subsequent step. It is not possible, however, to obtain substantially spherical beads, as the cutting of the filament produces cylindrical pellets with diameters normally larger than 1 mm and the equipment must be kept under pressure to avoid the pre-expansion of the pellets.

The incorporation of organic charges can be problematic. WO 00/43442 states that athermanous materials have a strong nucleating effect, and consequently, to prevent pre-expansion, it is necessary to operate with an underwater granulation system and under pressure. That process comprises the use of a particular die, wherein the expandable polymer is extruded through a series of small holes. Experts in the field know that this process is extremely binding as the temperature of the die surface is close to that of water and this leads the polymeric flow close to reach its solidification temperature. Due to the swelling during extrusion and to the necessity of producing extruded granulates having very reduced dimensions, very small holes are required, with diameters ranging from 0.3 to 1.2 mm. Consequently, extrusion through these holes requires very high shear deformation rates. This implies that, with this technology, extruded particles having dimensions lower than 1 mm cannot be obtained.

US 2005/156344 describes the influence of the geometry of the die holes (such as the diameter of the hole, the length/diameter ratio, the angles of the inlet and outlet cones), of the temperature of the molten product and of plasticizers on the swelling of the polymer at the outlet of the die holes and therefore on the diameter of the final bead. It describes that the expandable resin can contain various additives, such as nucleating agents, plasticizers, flame-retardants, organic or inorganic dyes and pigments, soluble or insoluble, such as carbon black, graphite or aluminium, up to 30%.

One of the problems known in the literature relating to the production of beads of mass-continuous expandable vinyl aromatic polymers is the necessity of cooling the polymer containing the expanding agent, before the extrusion of the same through the die. This cooling can be carried out, for example, by means of cooling elements inside the extrusion devices, by means of heat exchangers or through static mixing equipment with embedded cooling devices.

On the basis of this known art, the cooling of the polymer before granulation is essential to prevent the expansion of the same in the granulator and to obtain products having a regular shape.

EP 668,139, describes a process for the preparation of expandable plastic granulates having a diameter at least lower than 1 mm. According to that process, the temperature of the expandable molten polymer must be reduced to a few degrees above the solidification temperature of the polymer itself, to obtain these granulates.

It is well-known that the viscosity of thermoplastic polymers increases considerably when the temperature of the molten polymer approaches the solidification point. It is apparent that, when high viscosity is combined with high shear deformation rate, corresponding to the passage of the polymer through the die holes, a considerable pressure drop occurs when the polymeric flow passes through the die. This requires the use of particular dies, suited to mechanically sustain these pressure gradients.

Furthermore, the rapid cooling of the polymer, due to the submersion of the die surface under water ("underwater" configuration) makes the plugging of the die holes and flow instability extremely probable.

US 2005/140039 and US 2005/123638 describe a process (the former) and equipment for hot granulation (the latter) for the preparation of granules of expandable thermoplastic polymers. According to those patent applications, the obstructions and irregularity of the flow mentioned above can be prevented by means of a new granulation device wherein the molten polymer is extruded and immediately cooled by means of a chopped water spray and not underwater. Consequently, the expansion of the granulated product is avoided and, at the same time, plugging is limited. No information is provided on the procedure or on the production process of expandable beads containing a high quantity of additives.

EP 1,702,738 describes a process and equipment for the preparation, in continuous, of granules of expandable polymers. According to that application, plugging of the die holes can be avoided by constructing a specialized electronic control system which controls the process conditions and maintains the pressure and temperature of the molten polymer within a pre-established range. Systems based on an active electronic control of the stability, however, are not generally considered as being intrinsically reliable. Therefore they do not allow a high reliability of the plant and consequently their use is generally not advisable for large-scale production.

WO 2006/88392 describes a process which enables the continuous production of polystyrene and high impact polystyrene in the form of expandable granules, within a wide range of molecular weights. The innovation is the mixing system between the molten polystyrene and the expanding agent. The expandable beads are prepared by extrusion and cooling of the molten polymer and subsequent granulation. No particular data are supplied with respect to the quality of the resulting expandable granule and more specifically of the expandable granule with a high content of inorganic additives.

EP 1,693,413 describes a process for continuous production of expandable polystyrene particles containing inorganic silicates and zeolites to improve the insulating properties of the corresponding foams. The polymer is fed to an extruder and mixed with an expanding agent and with additives. It is then extruded, cooled and cut into particles. No indication is provided with respect to the granulator configuration, process conditions, the dimension and the shape of the particles obtained.

The expandable vinyl aromatic polymer particles obtained in a mass-continuous process can be badly affected by the orientation and mechanical stress due to the extremely rapid cooling to which the particles are exposed when granulated. When these granules are expanded and molded, this stress causes heterogeneity in the cellular structure which, in turn, negatively influences the mechanical and aesthetical properties of the manufactured final products. US 2005/140039 claims that, to solve these drawbacks, this stress can be released by annealing the granules at a temperature close to the glass transition temperature (Tg) or by means of nucleating additives. In any case, the effect of the inorganic additives on the nucleation has not been explored.

SUMMARY

We thus provide a process for the production of expandable particulates or granules, based on thermoplastic polymers, wherein an optimal dispersion is obtained of the expanding system and possibly additives, in particular the incorporation of relevant concentrations of inorganic pigments, insoluble in the polymeric matrix.

We also provide a process for the production of expandable particulates comprising a polymeric matrix consisting of polymers and copolymers with a vinyl aromatic base, such as, for example, polystyrene, high impact polystyrene (HIPS), styrene-acrylonitrile polymer (SAN); non-vinyl aromatic polymers, such as polyethylene, polybutylene terephthalate, polyethylene terephthalate; and blends thereof.

We further provide a process for the production of expandable particulates having a polymeric base suitable for a large scale production, therefore characterized by being compatible and easily incorporated in a petrochemical site, with good qualitative constancy of the product and an easy operation of the plant.

We still further provide a process for the production of expandable particulates having a polymeric base, capable of producing expanded articles with a high content of closed cells (>90%), a high sintering capability and uniform cellular size, ranging from 70 to 200 microns.

We yet further provide a process for the production of expandable particulates having a polymeric base, wherein the resulting expandable particulates show a reduced residual stress, to remove or strongly reduce the annealing phase of the same.

We further provide a process for the production of expandable particulates having a polymeric base, which, after expansion and molding, can give articles which meet the fire-resistance specifications according to the B2 test, DIN regulation 4102, part 2.

BRIEF DESCRIPTION OF THE DRAWINGS

The above-mentioned and other aspects of our processes will be evident from the following description, wherein the contents of this disclosure are described in detail and illustrated in the enclosed drawings. Variations in the procedures, structural characteristics and the arrangement of the parts, which can be identified by those skilled in the art, should all be considered as being included in the scope of this disclosure as well as the advantages obtained by the use thereof.

DETAILED DESCRIPTION

Figure 1:
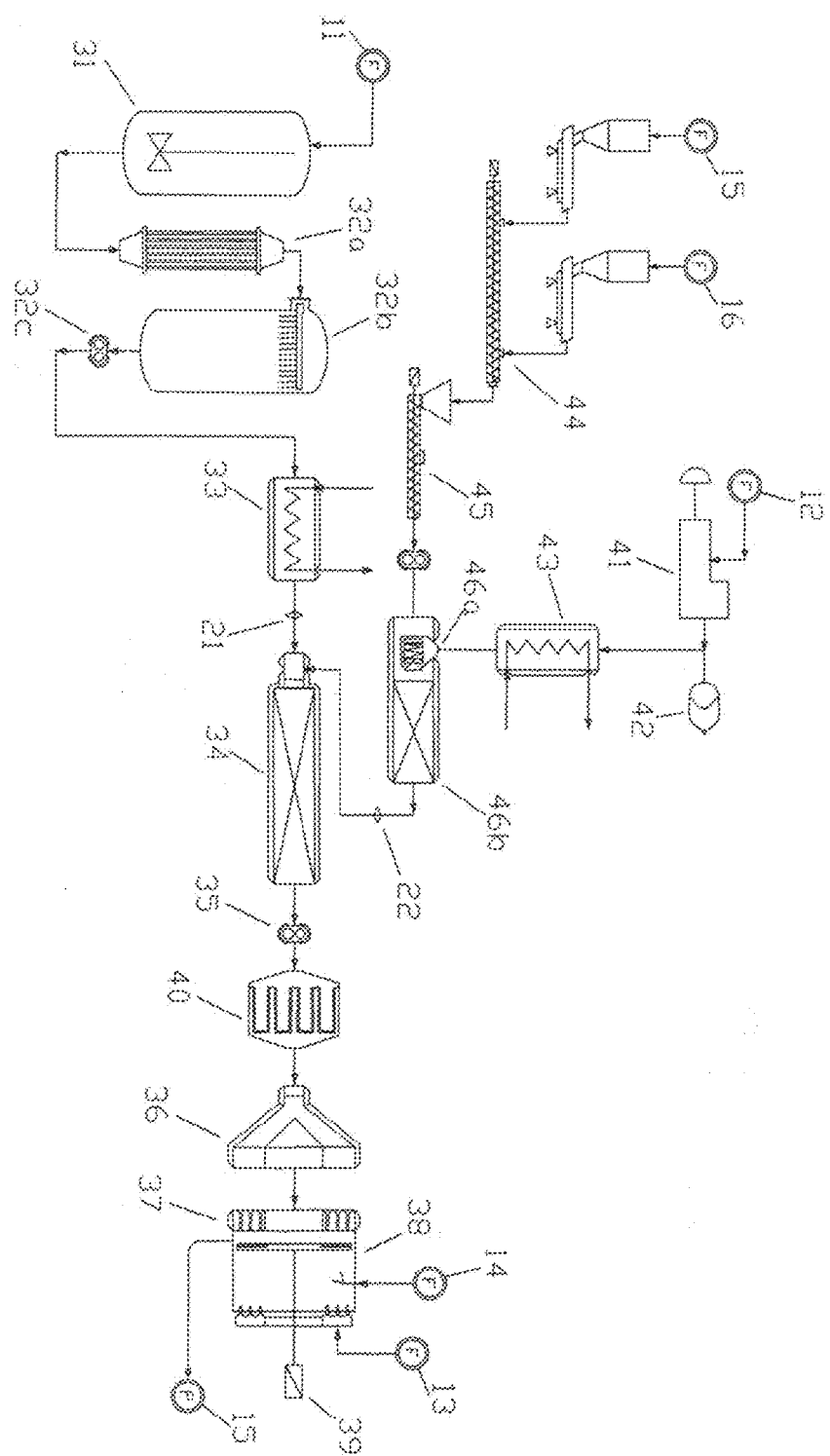
FIG. 1 is a schematic diagram of a side polymeric stream and expanding system.

The term "expandable granules based on thermoplastic polymers" used herein means thermoplastic polymers, for example, vinyl aromatic polymers, in the form of granules, containing an expanding system and possibly other additives, wherein the form of the granules is essentially ellipsoidal, for example, the shape of a walnut or a lenticular shape, having a particle volume ranging from 0.02 to 3.5 mm$^3$.

These expandable thermoplastic polymers in the form of granules, after expansion and molding, are particularly used in the production of household appliances or other industrial equipment, in packaging and thermal insulation in the building industry, due to their thermo-insulating properties.

The process and equipment described herein allow for the large scale production of expandable thermoplastic polymers at moderate cost and with an improved qualitative constancy.

We have now found that the above-mentioned scope and purpose have been achieved through a new process described herein. The process includes incorporation, in a first polymeric stream (hereinafter referred to as "main stream"), of a second polymeric stream (hereinafter referred to as "side stream") containing the expanding system and additive.

Alternatively, the expanding system can be directly incorporated into the main stream.

The resulting composition, in the molten state, is then homogenized and finely sieved by one or more filtering steps which either remove or disgregate the polymeric aggregates and the non-dispersed inorganic fillers.

The polymeric composite product is then extruded through a die and granulated, preferably according to the chopped water spray technology, described in US 2005/140039.

The polymer forming the main polymeric stream may be taken in the molten state from a continuous polymerization process. The polymer, coming from one or more polymerization steps, is typically removed from the possible dilution solvent, the non-reacted monomer and the oligomers, in a section called "devolatilization."

The so purified polymer is used directly, in the molten state, as the main polymeric stream of the process. For this purpose, the polymer coming from the devolatilizer preferably contains no more than 2,000 ppm of monomers and 8,000 ppm of dimers, trimers and oligomers, so as to prevent damage to the structure of the foam obtained after expansion of the resulting expandable particle polymers.

The polymer used as the main stream may be in the shape of granules. The granules are melted in a suitable device (a single-screw or twin-screw extruder, for example).

In both instances, the molten polymeric material is pressurized and then pushed into the subsequent process section, by means of any suitable device, typically a gear pump.

Advantageously, the additives are incorporated in a secondary polymer stream which subsequently joins, in the molten state, the main polymer stream.

The additives may be metered in a twin-screw extruder together with the granules of the polymer. Expediently, the extruder, after the melting section, contains mixing elements which allow a better distribution of the additives in the polymeric phase. The mass fraction of the polymeric phase must be at least equal to 20%, more preferably at least 40% with respect to the content of the polymer in the side fraction, to process the resulting molten mass successfully.

Advantageously, the extruder contains a degassing phase to remove possible solvents contained in the additive blend.

The temperature of the molten stream must be kept within a pre-fixed range. Typically, the minimum temperature is equal to the maximum temperature selected among the solidification temperatures of the molten components, plus 20° C., whereas the maximum temperature is the same plus 150° C.

Optionally, before entering the extruder, the additives and polymer in granules can be pre-mixed in a suitable mixer for solids, to favor a homogeneous distribution of the components. The preferred device for this operation is a screw mixer.

When liquid or gaseous additives are used, an efficient means to incorporate them is to inject the same into a side feeding point of the extruder, located downstream the melting and degassing section.

The additives consist of any material capable of enhancing the polymer performances and suitable for being processed in a single- or twin-screw extruder. These additives typically include lubricants, plasticizers, water repellents, antioxidants, nucleating agents, flame-retardants, bromine stabilizers, smoke suppressors. Some non-limiting examples are:

elementary carbon: graphite materials, carbon blacks, cokes, carbon nanofibres, glassy carbon;
  self-extinguishing agents: compounds based on halogens or halogen-free compounds such as hexabromocyclododecane, pentabromomonochlorocyclohexane, tetrabromobisphenol A bis(allyl ether) and pentabromophenyl allyl ether; among the above, hexabromocyclododecane and tetrabromobisphenol A bis(allyl ether) are preferred;
  nucleating agents such as polyethylene waxes having a molecular weight lower than 10,000 Dalton;
  synergistic self-extinguishing agents, i.e., molecules having a weak bond of the C—C, N—N or O—O type such as dicumylperoxide, cumene hydroperoxide, 3,4-dimethyl-3,4-diphenyl-hexane, 3,4-dimethyl-3-4-diphenyl butane, 3,6,9-triethyl-3,6,9-trimethyl-1,4,7-triperoxynonane;
  inorganic derivatives of silicon, magnesium, aluminium, such as talc, pyrophilite, silica, hydrotalcite, mica, montmorillonite and similar products;
  oxides and dichalcogenides of metals and semimetals.

The graphitization degree and the crystalline parameters are calculated in the following way:

a concentrate of graphite material, as described hereunder, is diluted in chloroform and mixed by a magnetic anchor impeller for 24 hrs. The solution is subsequently washed, filtered and dried in an oven for 10 hrs at 500° C., to remove water and other substances insoluble in chloroform.

Subsequently, the material is placed in an X-ray diffractometer. The diffractometric pattern is read between 10° and 70°.

The distance $d_{002}$ between the graphene planes is measured by the angle $\theta_{002}$ according to the Bragg law:

$$\lambda = 2 d_{002} \sin \theta_{002}$$

wherein $\lambda$ is the length for the line Cu K $\alpha_1$, i.e., 0.154 nm.

The highly oriented pyrolytic graphite has an interplane distance of 0.3354 nm. However, normally both natural and artificial graphites show a larger value, due to defects between the planes. As a result, $d_{002}$ is always higher than 0.3354 nm. The difference between the observed interplanar spacing and the reference value of 0.3354 nm is a measurement of the crystallinity and consequently of its graphitization degree.

The graphitization degree "g" is calculated according to the Maire and Mering formula:

$$d_{002}=0.3354g+0.3440(1-g)$$

wherein $d_{002}$ is computed from the peak value of the diffractogram curve, after effecting a noise removal and curve fitting procedure.

The solid additives which do not melt at the extrusion temperature of the molten stream must consist of fine particles. In particular, considering the population of non-meltable particles, the "d90", i.e., the dimension under which lies 90% of the population, typically must not be larger than half of the diameter of the die holes. Preferably, d90 must not be larger than ¼th of the diameter of the die holes. Dimension means the diameter as calculated by means of laser diffraction measurement on the non-meltable materials.

Non-limiting examples of granular polymers suitable for the preparation of the side stream include:
- homopolymers, random copolymers and block copolymers having a vinyl aromatic base; in particular polystyrene, styrene-butadiene-styrene rubber, styrene-isoprene-styrene rubber, styrene-ethylene-butylene-styrene (SEBS) rubber, styrene-ethylene-propylene (SEP) rubber, styrene-butylacrylate copolymer, high impact polystyrene (HIPS), acrylonitrile-butadiene-styrene (ABS), styrene-acrylonitrile (SAN);
- ethylene-based polymers, such as ethylene-vinyl acetate (EVA), polyethylene (PE), polybutylene terephthalate (PBT), polyethylene terephthalate (PET);
- condensation (co)polymers such as polycarbonates and polyesters, (meth)acrylic polymers, polyphenylene oxide (PPO), technical engineering polymers, polyamides, polylactates.

Fragments of the above-mentioned polymers, as well as ground materials of post-use products and undesired expandable polystyrene beads (such as undesired fractions resulting from the suspension production process) can be fed to the equipment for recycling.

The term "expanding system" as used herein, means an expanding agent, when used as such in the expandable polymeric composition, or a blend of expandable agents, when more then one is used.

"Critical temperature" of the expanding system means the critical temperature of the expanding agent, when the expanding system consists of only one expanding agent; or the critical temperature of the expanding agent which is the majority in weight, when the expanding system consists of a blend of expanding agents, wherein one of the agents is contained in the blend for over 50% by weight; or, in the other cases, the critical temperature of the blend of the expanding agents.

"Critical pressure" of the expanding system means the critical pressure of the expanding agent, when the expanding system consists of only one expanding agent; or the critical pressure of the expanding agent which is the majority in weight, when the expanding system consists of a blend of expanding agents, wherein one of the agents is contained in the blend for over 50% by weight; or, in the other cases, the critical pressure of the blend of the expanding agents.

Non-limiting examples of expanding agents which can be used include hydrocarbon compounds having from 3 to 7 carbon atoms, carbon dioxide, carbon monoxide, water, ethylic alcohol and ether. Among these, hydrocarbon compounds having from 4 to 6 carbon atoms are preferred. It is known that a blend or system of expanding agents having different boiling points favors the expansion of the foam. The expanding system is preferably used in a content ranging from 2 to 10% by weight, based on 100 parts by weight of the expandable polymeric composition.

In a first method, the expandable system is injected into the side polymeric stream which is in the molten state. The injection can be effected by means of any procedure known in the art. For example, in the single-screw extruder itself, through a side inlet, or downstream the same, in the stream of molten extruded products.

The expanding system can be distributed and dispersed in the additive stream. Any device useful for this purpose can be used, such as, for example, static and dynamic mixers. A complete mixing of the expanding system into the additive stream is not required.

In a second method, the expanding system and the side polymeric stream are added to the main stream, separately.

In a third method, the expanding system is divided into two streams. The largest one is injected directly into the main polymer stream, whereas the other is added to the side stream.

Advantageously, the expanding system can be first pressurized (for example, by means of a diaphragm metering pump) and subsequently heated before its injection into the polymeric stream. According to this scheme, the temperature of the expanding system, after heating, is at least 60° C., more preferably, it is higher than the glass transition temperature of the major polymer with respect to the weight.

To obtain a constant flow of the expanding system and a constant ratio between the flow rate of the same and that of the expandable composition of the resulting polymer, any technique known in the art can be used. For example, it is possible to adjust the rate of the metering pump of the expanding system in feedback with respect to the mass flow rate of the same, measured by means of a flow meter according to the Coriolis principle. Pulsation dampeners can be inserted downstream the metering pump to stabilize the stream. It is effective the use of retaining devices, situated very close to the injection point, to prevent dangerous refluxes of polymer in the stream of the expanding system, which can occur during accidental and sudden pressure variations in the polymer itself.

It is preferable for the additive stream to be less viscous than the main stream of the vinyl aromatic polymer at temperature conditions and shear deformation rate found in the injection point and in the subsequent mixing device.

One or more devices are used for dispersing and distributing the expanding system and the side stream in the main stream. Both static and dynamic mixers can be used.

Typically, the minimum residence time for this mixing phase is 100 seconds. If static mixers are used, preferably the overall pressure drop through the mixer is higher than 20 bar, and the pressure drop rate of the polymer, computed on the basis of the flow rate of the same and of the cross section, is kept over 0.2 bar per second, for at least 5 seconds.

The polymeric stream must be brought to a reference temperature before mixing with the expanding system. This reference temperature is calculated as the critical temperature of the expanding system, more or less 25° C.; more preferably, as the critical temperature of the expanding system, more or less 15° C.

The pressure of the polymeric stream must be higher than the critical pressure of the expanding system, that is, at a value which is more than the value of the critical pressure.

Preferably, these pressure and temperature reference conditions must be maintained from the injection point of the expanding system till substantial mixing of the same with the polymer. Alternatively, these conditions can be maintained until the granulation of the composition.

Optionally, a moderate cooling of the final expandable polymeric stream can be effected before granulation. In this method, the temperature of the compound leaving the possible cooling step, should preferably be at least 50° C. more than the glass transition temperature of the majority polymer, with respect to weight. Tube-bundle heat exchangers or static mixer reactors (SMR) can be used.

On the contrary, according to the state of the art, (see, for example, WO 98/51735 and WO 00/43442 or US 2005/0156344), the cooling of the polymer before granulation is essential, or at least preferable. For example, in EP 668,139 it is stated that the molten product is cooled to a few degrees above the solidification temperature, i.e., under very different conditions with respect to those specified herein.

Advantageously, the expandable polymeric compound is passed through a filtering device before going through the die and being granulated. The filtering device consists of one or more nets, through which the composition is passed in the molten state.

Surprisingly, it has been found that the filtering nets cause a micro-mixing action of the additives and of the expanding system in the polymeric matrix. This action is favored by the extremely high shear deformation rates produced when the polymer passes through the net meshes, and can be controlled by varying the section of the filtering area (and therefore the polymer rate) and mesh size.

The second but not less important filtering action, is the sieving of excessively voluminous particles and aggregates of polymer and additives, which can contribute to obstructing the holes of the die.

The filter not only removes the additive fraction, which, from the beginning, was excessively large in size, but also possible aggregates which may be produced in the polymeric stream during the preceding operations due to chemical reactions and physical-chemical effects between the components of the same polymeric mix, such as, for example, crosslinking reactions between molecules having unsaturated bonds.

A strict control of the mesh dimension is necessary: filters with excessively large meshes are not effective in the above-mentioned filtering actions; vice versa, an extremely fine mesh size prevents the passage of the additive particles and considerably increases the pressure drop, making it also necessary to effect a frequent filter change.

To obtain the expandable polymeric particle composition, net mesh size must be smaller than half of the diameter of the die holes, more preferably ranging from a third to a tenth of the diameter.

The pressure reduction of the polymeric composition through the filter nets is preferably lower than 200 bar, more preferably ranging from 10 to 100 bar.

To allow a continuous running of the process, it is preferable to use either a system to clean the filter nets periodically, or to replace them without affecting the production of the plant. To this purpose, systems can be used, called filter changer, which allow a dirty filter to be substituted with a new one within a few seconds, or continuous filters, wherein the filtering net is moved slowly, but continuously, in a transverse direction with respect to the polymer flow.

The filtering device can be a net in the form of a disk, which covers completely the cross section of the polymeric composition, or it can have a more complex form, such as, for example, a series of cartridges arranged in the direction of the fluid. In the latter version, advantageously, a redistribution of the polymeric stream is obtained, which enhances its homogeneity.

The use of several filtering nets, in series, can further improve the dispersion of the additives and expanding system. In this case it is useful to employ a succession of alternating fine and large mesh nets, following the direction of the stream.

The expandable composition is then fed to a cutting head, which homogeneously distributes the polymer in the die, in which the expandable composition is extruded and granulated.

The die is preferably heated at least to the temperature of the incoming expandable composition, more preferably from 10 to 60° C. above this temperature. The heating can be obtained by means of any of the processes known in the art, for example by means of electric resistances or by the circulation of heated fluid in channels inside the body of the die.

The cutting device used for producing the particle expandable composites is described in detail in US 2005/123638. For the characteristics of the die and the granulation chamber, reference should be made to the above publication.

Typically, the swelling of the expandable compositions ranges from about 1.2 to 3.0, in relation to the composition, shear rate and temperature of the molten stream. By controlling the diameter of the holes and the swelling, it is possible to obtain expandable particulates with the desired size, in particular, within the range of 0.6 to 2.2 mm.

The granulation chamber must be pressurized to avoid the expansion of the expandable granules. The pressure necessary for preventing this undesired phenomenon depends, in particular, on the contents and typology of the expanding system and on the additives used. Typically, the required pressure ranges from 1.5 to 12 barg, more preferably from 2 to 8 barg.

Preferably, the pressure of water feeding spray nozzles is higher than the pressure of the cutting chamber by at least 2 bar. In this way, an adequate and uniform flow-rate is conferred to the water jets, which is essential to prevent the holes of the die from being obstructed.

It is important to evaluate the fraction of time, with respect to the total, in which the water coming from the nozzles directly reaches the surface of the die, instead of being interrupted by the moving knives and relative support.

It is necessary to avoid this time fraction from being null, as, in this case, the knives would completely block the water passage towards the surface of the die, preventing its correct cooling. The factors influencing this time fraction are, among others, the rotation rate of the knives and water pressure.

The time fraction preferably ranges from 5 to 80%, more preferably from 10 to 60%.

The water temperature should preferably range from 10° C. to not more than 20° C. above the glass transition temperature of the expandable granulate, more preferably from 10° C. to not more than 15° C. above the glass transition temperature of the expandable granulate.

The granulation of the expandable polymer can be further facilitated by using detaching additives which must be dosed in the water, before the formation of the jet.

Preferred detaching agents are polysiloxanes such as polydimethylsiloxane, as such or in emulsion. The quantity of polysiloxanes to be added to the water is higher than 10 ppm, preferably from 10 to 400 ppm.

Optionally, between the mixing devices and the die it is possible to interpose a three-way valve for polymers. Under normal running conditions, the valve is aligned towards the die. Vice versa, during the start-up, the valve is aligned towards a discharge or other device suitable for receiving the molten polymer. By deviating the polymer stream from the start-up position to the operating position, the polymer stream can start to flow almost immediately from the die holes, thus reducing the risk of obstructing the die holes.

The expandable particulates thus obtained can be optionally and not necessarily subjected to thermal treatment in an annealing step, to release possible residual stress and improve the cell structure resulting from the transformation of the expandable product. The annealing process consists in maintaining the expandable product, for a period of time preferably longer than a minute, at a pre-determined temperature. The temperature generally ranges from the glass transition temperature of the expandable particulate plus or minus 15° C.

The annealing is preferably carried out by maintaining the expandable particulate at a pressure higher than 0.5 barg and cooling the same to a temperature lower than 45° C. before depressurization.

The vinyl aromatic polymers processed according to the methods provided herein, show a reduced residual stress in the granulated product, consequently the cellular structure resulting from the transformation of the granulates, can be good even without annealing or without the incorporation of nucleating agents.

Figure 2:
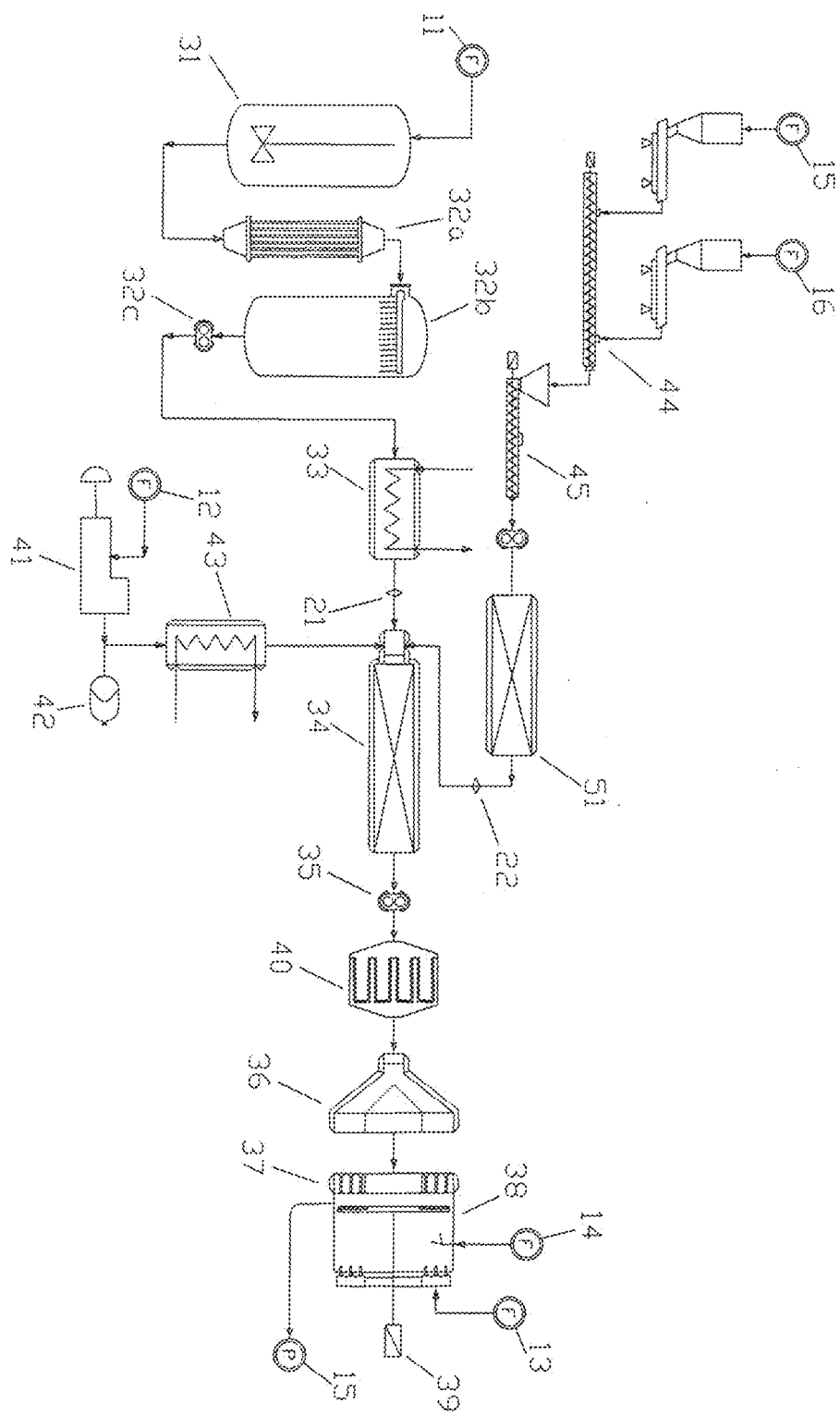
FIG. 2 is a schematic diagram of another side stream and expanding system.

The process for the production of granules of expandable thermoplastic polymers can be better understood by referring to the schematic representation of FIGS. 1 and 2, which represent illustrative and non-limiting examples.

With reference to the schematic representation shown in FIG. 1, the vinyl aromatic monomers, co-monomers, ethyl benzene and other additives (11) are fed to the reactor (31) and polymerized. The stream is heated by the heat exchanger (32a) and is passed through a perforated distributor into a container under vacuum (32b) to remove monomers, oligomers, ethyl benzene and other volatile materials. The resulting molten polymer is fed, by means of a pump (32c) to a second heat exchanger (33) where it is brought to the reference temperature (for example, 190° C.). The pumps (32c) and (35) are controlled to ensure a pressure in the polymeric stream (21) higher than the reference pressure.

A polymeric stream (15) and an additive stream (16) are fed, through metering devices, to a continuous screw mixer (44) and subsequently to a twin-screw extruder (45) in which the polymer is melted and the additives incorporated.

The expanding system (12) is metered by means of a diaphragm pump (41) to a heat exchanger (43) where it is heated. The pressure fluctuations produced by the pump (41) are levelled by a pulsation dampener (42). The expanding system is heated and injected into the additive feeding (46a) through a non-return valve located inside the duct carrying the additives. A small static mixer (46b) provides an initial mixing between the additive feed and the expanding system. The resulting composition (22) is added to the main stream of the vinyl aromatic polymer (21) and mixed by means of a static mixer (34). The resulting stream, whose pressure is increased by the pump (35), is first fed to a filtering device (40), and subsequently to the distributor (36) and to the die (37), wherein the expandable polymeric composition is subdivided into small channels and extruded through several holes.

In the granulation chamber (38), water (13) is sprayed against the die, through a set of spray nozzles. A controlled amount of nitrogen (14) is metered into the granulation chamber to prevent it from flooding. The expandable composition is cut by a set of knives joined to a rotor (39) and the resulting mix of water plus granules is recovered (15).

The schematic representation of FIG. 2 shows a different arrangement of the side polymeric stream and expanding system. According to this scheme, the side stream (16), after the incorporation of the additives in the polymer by means of the extruder (45), passes through a mixing device (51) which completes the dispersion of the additives in the polymeric stream. The expanding system (12) is pumped (41) and heated (43) as in the previous scheme. However, instead of being injected into the side stream it is directly added to the main stream of the polymer and mixed therein (34).

Figure 3A:
FIGS. 3a, 3b and 3c are photographs of expandable composites.
Figure 3B:
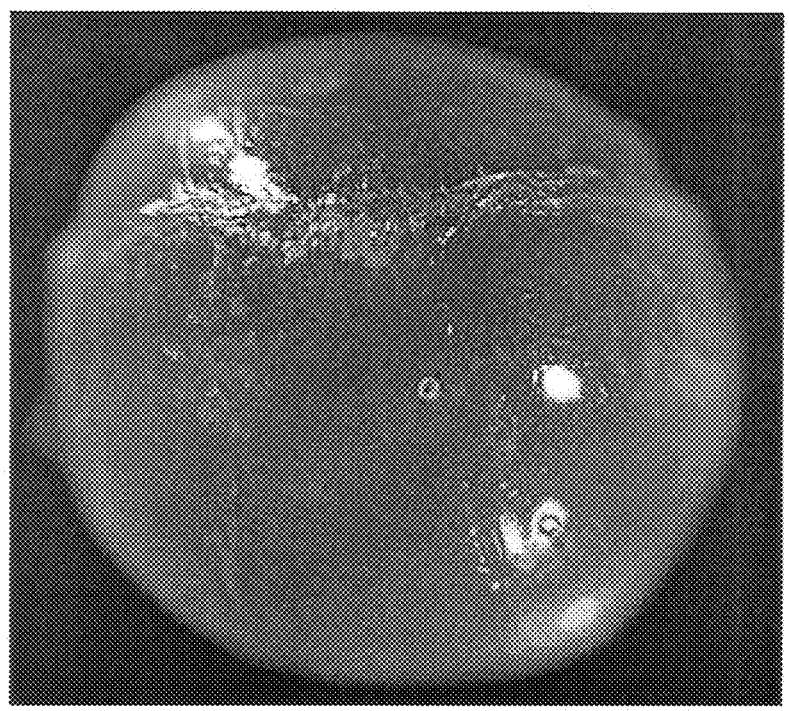
Figure 3C:
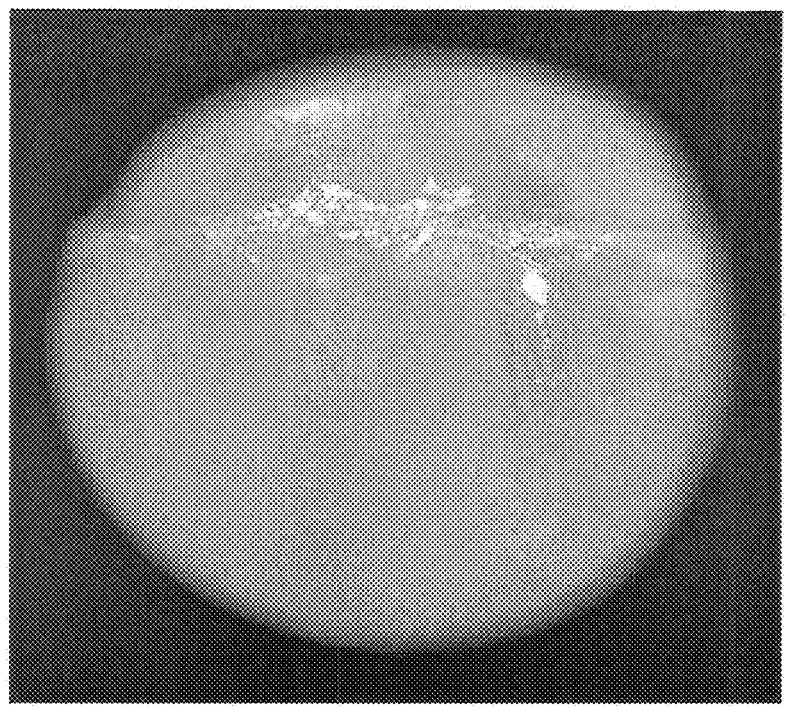

Under the above-mentioned conditions, particulate or granules of expandable composites are obtained substantially having an ellipsoidal shape, for example, the shape of a walnut or lenticular (see FIGS. 3a, 3b and 3c). It is possible to quantitatively characterize this shape by means of a shape factor. Many definitions of the same can be found in literature (see, for example, Sukumaran, B. and Ashmawy A. K. (2001) "Quantitative characterization of the Geometry of Discrete Particles", Geotechnique, vol. 51, nr. 7, September, pages 619-627). The following adimensional definition of the shape factor is used herein:

$$SF = 36 \cdot \pi \cdot (V^2/A^3)$$

wherein V is the volume of the expandable composite particle and A the area of the corresponding surface. The shape factor SF is equal to 1 for a perfect sphere and decreases with an increase in the anisotropy, approaching zero for cylinders having a length to diameter ratio which approaches infinity.

Expandable composite granules are obtained with a shape factor SF, defined as above, ranging from 0.60 to 0.99, more preferably the shape factor ranges from 0.70 to 0.98.

Higher shape factors can be obtained by increasing the polymer temperature and decreasing water cooling (for example, by diminishing the flow). Under these conditions, however, a pre-expansion is more probable and the polymer exiting from the die holes can be spread onto the surface of the same.

Typically, the granules obtained through the extrusion of the polymer and the subsequent underwater granulation do not show a walnut shape and smaller shape factor values are obtained.

These smaller shape factors frequently cause difficulties during the subsequent feeding of these expandable granules in the molding machines and, therefore, preferably they should be avoided.

Surprisingly, the composite granules produced generally show an excellent expandability and moldability when processed according to standard methods in use.

A few illustrative and non-limiting examples are provided hereunder for a better understanding of the compositions and methods.

Example 1

A liquid mixture consisting of 8.0% by weight of ethyl benzene, 84.98% by weight of styrene, 7.0% by weight of [alpha]-methyl styrene, 0.02% by weight of divinyl benzene, is fed into a reactor (31). The mixture is gradually brought to a temperature of 135° C. After a residence time of about 4 hrs, the reagent polymeric composition, having a conversion equal to 70%, is heated to 240° C. by means of a diathermic oil (32a) heat exchanger and is subsequently fed to a devolatilizer (32b) to remove the residual monomer and solvent. The resulting composition has an onset of glass transition temperature ("Tg onset") at 104° C., a melt flow index (MFI 200° C., 5 kg) of 9, a molecular weight Mw of 190,000 g/mol and a Mw/Mn ratio of 2.8, wherein Mw is the weight average molecular weight and Mn is the number average molecular weight. 830 parts of the composition are fed to the heat exchanger (35) which lowers the temperature to 180° C.

151.6 parts of N2982 (polystyrene having a Mw equal to 130,000 g/mol, Mw/Mn equal to 2.3, MFI (200° C., 5 kg) equal to 25 g/10', produced by Polimeri Europa) (15) are fed into a twin-screw extruder (45).

A mixture consisting of 8.0 parts of styrene-isoprene-styrene block copolymer SOL T 190, produced by Polimeri Europa, 8.4 parts of BR-E 5300 (stabilized hexachlorocyclododecane sold by Chemtura) and 2.0 parts of Perkadox 30 (2,3-dimethyl-2,3-diphenyl butane, sold by Akzo Nobel) (16) are fed into the same device. A gear pump increases the feeding pressure of the molten additives to 270 barg.

55 parts of a mixture of n-pentane and iso-pentane, wherein the n-pentane/iso-pentane ratio is 70/30 by weight, are metered, by means of the pump (41), to the heat exchanger (43), where the temperature of the expanding system is increased to 110° C. The heated expanding system is injected into the additive stream (46a) and incorporated therein by means of a set of mixing elements (46b). The resulting side stream (22) has a temperature of 180° C. and a pressure of 240 bar. 150 parts of the stream (22) are added to 850 parts of the main stream (21) and mixed therein by a second mixing device (34).

A second gear pump (35) feeds the resulting polymeric stream to a filter changer device (40) in which a filtering net is inserted, having a mesh of 200 microns, supported by a second net with a mesh of 1,000 microns.

The filtered composition is brought firstly to the distributor (36) and then to the die (37), where it is extruded through a series of holes having a diameter of 0.5 mm (37), and granulated (38). The water jet (13) has a temperature of 45° C. and an upstream pressure of 20 bar. A nitrogen flow (14) prevents the granulation chamber from flooding. The ratio in mass flow between the nitrogen flow (14) and the water stream (13) is 1:3. The pressure in the granulation chamber is set at 3.5 bar.

The granulated expandable resin is collected from the slurry (15), dried by means of a centrifuge and covered with a coating consisting of 0.2% of mono-digliceryl stearate and 0.1% of zinc stearate, with respect to the weight of the expandable particle. The expansion is effected under atmospheric steam at 100.3° C. for 3 minutes, the expanded beads are then left to dry in air for 24 hrs.

Subsequently, a part of the expanded beads is molded in a press having a cylindrical molding chamber (90 mm high, 250 mm in diameter), whereas the remaining beads are expanded a second time in atmospheric steam for 2 minutes.

The expandable granulates have a typical walnut shape, as shown in FIG. 3b.

Example 2

The mix used in Example 1 is repeated, but with the process units arranged as in FIG. 2.

Example 3

Example 1 is repeated, but with the side stream (16) consisting of 33.1 parts of BR-E 5300, 47 parts of Minstron 002 talc produced by Luzenac, 10 parts of ethylene-bis-stearamide and 6.5 parts of Perkadox 30, whereas the polymer feeding (15) consists of 73.4 parts of N2982. The pressure in the granulation chamber is set at 4.8 bar.

The expandable granulates have a typical walnut shape, as shown in FIG. 3c.

Example 4

Example 1 is repeated, but the side stream (16) consists of 24.3 parts of BR-E 5300, 52 parts of graphite MetalPURE 5595 produced by Superior Graphite, 10 parts of ethylene-bis-stearamide and 5.1 parts of Perkadox 30, whereas the polymer feeding (15) consists of 78.6 parts of N2982. The pressure in the granulation chamber is set at 5.2 bar.

The expandable granulates have a typical walnut shape as shown in FIG. 3a.

Example 5

Example 4 is repeated, but a third heat exchanger is positioned between the mixer (34) and the pump (35). The expandable polymeric composition is cooled to 170° C. through the heat exchanger and subsequently granulated following the same conditions indicated in Example 1.

Example 6

Example 1 is repeated, but the side stream (16) consists of 35 parts of magnetite produced by Palabora Mining Company and 10 parts of ethylene-bis-stearamide, whereas the polymer feeding (15) consists of 125.0 parts of N2982. The pressure in the granulation chamber is set at 5.5 bar.

Example 7

Example 1 is repeated, but feeding 750 parts of polymer to the heat exchanger (35). The side stream (16) consists of 10 parts of ethylene-bis-stearamide, whereas the polymer feed (15) consists of 140.0 parts of polyethylene FG-20 produced by Polimeri Europa and 100 parts of block copolymer styrene-isoprene-styrene SOL T 190 produced by Polimeri Europa.

Example 8

Example 1 is repeated, but the liquid mixture fed to the reactor (31), consists of 8.0% by weight of ethyl benzene, 84.5% by weight of styrene, 7.0% by weight of [alpha]-methyl styrene, 0.5% by weight of block rubber styrene-butadiene-styrene (SBS).

Comparative Example 1

Example 1 is repeated but the polymer temperature in (21) and (22) is increased to 230° C.

Comparative Example 2

Example 1 is repeated but the mass flow ratio between water (13) and nitrogen (14) fed to the granulator (38) is brought to 10:1. As a result, the flooding of the granulation chamber is obtained.

Comparative Example 3

Example 1 is repeated but a third heat exchanger is positioned between the mixer (34) and the pump (35). The expandable composition is cooled to 150° C. through the exchanger and subsequently granulated according to the same conditions as in Example 1.

Table 1 and Table 2 show, for each example and comparative example, the shape factor, the average size of the granulates, the average dimension of the cells, the quality of the same, the density after 3 minutes of expansion, the density reached after a second expansion of 2 minutes time, the result of the self-extinguish test B2 according to DIN 4102, part 2, and the sintering percentage of the molded product.

As can be seen, the expandable granulates and relative expanded and molded products, show a good processability during expansion and molding. It has been surprisingly found that it is possible to obtain expanded products containing high quantities of various additives, using the same methods used on expandable vinyl aromatic polymers not containing the additives, without noticing particular deteriorations in performances.

The Comparative Examples, which show products obtained by modifying process parameters outside the ranges disclosed herein, or by altering the methods provided herein, show either difficulty in producing low density manufactured products, or the quality of the same, in particular the cell structure is not adequate.

The term "part" implicitly refers to "part by weight," if not otherwise specified. The same applies to the percentage values.

Our methods and products are described in detail, with reference to preferred examples of the same, but it is understood that variations and modifications can be applied, within the spirit of the disclosure. Whereas it is evident that the examples presented herein satisfy the aspects specified above, numerous modifications and other examples can be conceived by those skilled in the art.

It is therefore understood that the enclosed claims herein cover all of these modifications and other aspects, which form a part of the scope of this disclosure.

TABLE 1

|  | Average granule size (mm) | Cell average size in the foam (μm) | Cell quality | Sintering of the foam (%) |
|---|---|---|---|---|
| Examples |  |  |  |  |
| 1 | 0.88 | 160 | good | 80 |
| 2 | 0.92 | 180 | good | 90 |
| 3 | 0.95 | 130 | good | 70 |
| 4 | 0.98 | 100 | good | 80 |
| 5 | 0.96 | 140 | good | 80 |
| 6 | 1.10 | 190 | average | 70 |
| 7 | 0.91 | 180 | average | 70 |
| 8 | 0.93 | 140 | good | 80 |
| Comparative examples |  |  |  |  |
| 1 | 1.1 | n.a. | very poor | 50 |
| 2 | 1.05 | 160 | scarce | 60 |
| 3 | 0.95 | 220 | average | 60 |

TABLE 2

|  | Pigments (%) | Shape factor | Density after $1^{st}$ expansion (g/l) | Density after $2^{nd}$ expansion (g/l) | B2 test result |
|---|---|---|---|---|---|
| Examples |  |  |  |  |  |
| 1 | — | 0.97 | 15.4 | 9.5 | passed |
| 2 | — | 0.97 | 16.2 | 10.1 | passed |
| 3 | Talc 4.7% | 0.88 | 13.5 | 8.0 | passed |
| 4 | Graphite 5.2% | 0.91 | 13.1 | 8.5 | passed |
| 5 | Graphite 5.2% | 0.82 | 14.1 | 9.5 | passed |
| 6 | Magnetite 3.5% | 0.73 | 16.1 | 11.5 | passed |
| 7 |  | 0.75 | 19.1 | 13.5 | passed |
| 8 |  | 0.96 | 15.2 | 9.0 | passed |
| Comparative examples |  |  |  |  |  |
| 1 |  | 0.71 | 22.4 | 12.8 | not passed |
| 2 |  | 0.65 | 18.5 | 14.1 | n.a. |

The invention claimed is:

1. A process for preparing expandable granules based on thermoplastic polymers through a granulation die, comprising:
   i) bringing a stream of molten vinyl aromatic polymer to a selected temperature, wherein said selected temperature ranges from a critical temperature of an expanding system minus 25'C and a critical temperature of the expanding system plus 25° C.;
   ii) incorporating into a second stream of molten polymeric material, from 0 to 60% by weight, with respect to the weight of a resulting stream of inorganic and organic additives containing, less than 10 percent by weight of particles having a size larger than half of the diameter of holes of the die;
   iii) incorporating an expanding system in a polymeric composition in a molten state (ii) at a selected pressure, wherein said selected pressure is higher than a critical pressure of the expanding system;
   iv) incorporating the polymeric composition (iii) in the stream of vinyl aromatic polymer (i);
   vii) granulating the expandable polymeric composition thus obtained in a cutting chamber of a device for hot granulation of thermoplastic polymers, comprising:
      a) a die comprising a cylindrical body including to series of extrusion holes on an external surface and polymer adduction channels positioned inside the cylindrical body, in correspondence with and connected to the holes;
      b) a set of knives situated in correspondence with the die holes, rigidly connected to a rotating shaft;
      c) a set of nozzles situated behind the set of knives which generates a liquid jet directed against the die;
      d) an inlet from which a stream of gas is fed;
   and in which the stream of gas coming from said inlet (d) prevents flooding of the cutting chamber.

2. The process according to claim 1, wherein said expanding system comprises an expanding agent or a mixture of expanding agents.

3. The process according to claim 1, wherein the expanding system is heated to a temperature equal to or higher than the glass transition temperature of polymer present in the process in a largest amount by weight, before incorporation in the polymeric stream.

4. The process according to claim 1, further comprising before the granulation (vu):
   vi) passing the expandable composition through a filter having a spacing of mesh forming the filter which is equal to not more than half of the diameter of the die holes, maintaining the pressure of the molten product at a value higher than the critical pressure of the expanding system.

5. The process according to claim 4, wherein the filter has a mesh size ranging from a tenth to a third of the diameter of the die holes.

6. The process according to claim 1, wherein the expanding system is directly incorporated in the vinyl aromatic stream (i).

7. The process according to claim 6, wherein the incorporation (iv) of the polymeric composition and expanding system is effected by static or dynamic mixing devices, for a minimum residence time of 100 seconds and, at the same time, maintaining the pressure of the molten product at a value higher than the critical pressure of the expanding system.

8. The process according to claim 1, further comprising before the granulation (vii):
   v) cooling the expandable polymeric composition (iv) at a temperature which is at least 50° C. more than the glass transition temperature of a majority polymer, with respect to weight, maintaining the pressure of the molten product at a value higher than the critical pressure of the expanding system.

9. The process according to claim 1, further comprising, after the granulation of the expandable polymeric composition (vii):
   viii) heating the granulated expandable composition to a temperature ranging from the glass transition temperature of the expandable composition minus 15'C to the glass transition temperature of the expandable composition plus 15° C., for a period longer than 60 seconds; and
   ix) cooling resulting annealed granules to a temperature of not more than 45° C.

10. The process according to claim 9, wherein annealing is effected for a period of time longer than 180 seconds, and wherein both annealing (viii) and cooling (ix) are carried out at a pressure higher than 0.5 barg.

11. The process according to claim 1, wherein said vinyl aromatic polymer stream of (i) is in the molten state and comes directly from a polymerization plant.

12. The process according to claim 11, wherein said vinyl aromatic polymer stream, which comes from an outlet of a devolatilizer, is directly fed in the molten state.

13. The process according to claim 1, wherein said stream of vinyl aromatic polymer of (i) is obtained by melting solid particulates of polymers in an extruder.

14. The process according to claim 1, wherein the vinyl aromatic polymer material (i) is produced by polymerization of styrene with 0-50% by weight of [alpha]-methyl styrene; alkyl (meth)acrylate, wherein the alkyl group is a $C_1$-$C_4$-alkyl group; vinyl acetate; acrylonitrile: conjugated dienes and mixtures thereof.

15. The process according to claim 1, wherein the polymeric material in (ii) is selected from one or more of the following materials;
   a) homopolymers, random copolymers and block copolymers having a vinyl aromatic base, selected from polystyrene, styrene-butadiene-styrene, styrene-isoprene-styrene, styrene-ethyl ene-butylene-styrene (SEBS), styrene-ethylene-propylene (SEP), styrene-butylacrylate copolymers, high impact polystyrene (HIPS), acrylonitrile-butadiene-styrene (ABS), styrene-acrylonitrile (SAN);
   b) polymers based on olefins, selected from ethylene-vinyl acetate (EVA), polyethylene (PE), polybutilene terephthalate (PBT), polyethylene terephthalate (PET);
   c) condensation (co)polymers selected from poly and polyesters, (meth)acrylic polymers, polyphenylene ether (PPO/PPE) technical engineering polymers, polyamides, polylactates.

16. The process according to claim 1, wherein a part or the whole of the polymer in (ii) is obtained by melting vinyl aromatic-based postconsumer products.

17. The process according to claim 1, wherein the additives in (ii) are selected from;
   elementary carbon selected from carbon black, coke, carbon nanofibres, glassy carbon and graphite material having, a graphitization degree, calculated by means of the Maire and Mering formula, of at least 0.2;
   b) self-extinguishing agents selected from halogenated aliphatic or aromatic compounds or halogen-free compounds;
   c) synergistic self-extinguishing agents selected from compounds having a C—C, N—N or O—O labile bond;
   d) inorganic derivatives of silicon, magnesium, aluminium, selected from talc, hydrotalcite and mica;
   e) oxides and dichalcogenides of metals and semi-metals.

* * * * *